(12) United States Patent
Stewart et al.

(10) Patent No.: US 8,591,157 B1
(45) Date of Patent: Nov. 26, 2013

(54) DIRECT LOAD INDICATING FASTENER ASSEMBLY

(75) Inventors: Robert E. Stewart, Farmington Hills, MI (US); Nicholas Strumbos, Birmingham, MI (US)

(73) Assignees: Robert E. Stewart, Farmington Hills, MI (US); Nicholas Strumbos, Birmingham, MI (US)

( * ) Notice: Subject to any disclaimer, the term of this patent is extended or adjusted under 35 U.S.C. 154(b) by 532 days.

(21) Appl. No.: 12/847,628

(22) Filed: Jul. 30, 2010

(51) Int. Cl.
*F16B 31/02* (2006.01)

(52) U.S. Cl.
CPC ............. *F16B 31/02* (2013.01); *F16B 31/028* (2013.01)
USPC ................................ 411/10; 411/11; 411/533

(58) Field of Classification Search
USPC ............ 411/8–11, 352, 353, 371.2, 372, 427, 411/429–431, 511, 516, 519–522, 533, 965, 411/969, 970, 999, 517
See application file for complete search history.

(56) References Cited

U.S. PATENT DOCUMENTS

| | | | | |
|---|---|---|---|---|
| 3,163,198 A * | 12/1964 | Zahodiakin | .................... | 411/112 |
| 3,233,497 A * | 2/1966 | McCormick | .................... | 411/517 |
| 3,561,075 A * | 2/1971 | Selinko | ........................ | 24/704.1 |
| 3,783,734 A * | 1/1974 | Velthoven | ........................ | 411/8 |
| 3,881,392 A * | 5/1975 | Curtis | ............................. | 411/11 |
| 4,020,734 A * | 5/1977 | Bell | ................................ | 411/10 |
| 4,479,747 A * | 10/1984 | Pagel | ................................ | 411/8 |
| 4,571,133 A * | 2/1986 | Lindow | ............................ | 411/11 |
| 5,507,517 A * | 4/1996 | Krawczak | ....................... | 411/533 |
| 5,700,121 A * | 12/1997 | Minola | ........................ | 411/432 |
| 5,722,807 A * | 3/1998 | Hodge | ............................ | 411/10 |
| 6,039,524 A * | 3/2000 | McKinlay | ...................... | 411/149 |
| 6,227,784 B1 * | 5/2001 | Antoine et al. | ............... | 411/369 |
| 6,227,785 B1 * | 5/2001 | Kilgore | .......................... | 411/526 |
| 6,676,345 B2 * | 1/2004 | Szczukowski et al. | ........... | 411/9 |
| 6,712,031 B2 * | 3/2004 | Harada et al. | .............. | 123/90.39 |
| 7,083,372 B2 * | 8/2006 | Winker | .......................... | 411/313 |
| 7,128,511 B2 * | 10/2006 | Hewgill | ........................ | 411/149 |
| 7,544,028 B2 * | 6/2009 | Tournier et al. | ............... | 411/121 |
| 7,635,243 B2 * | 12/2009 | Turner et al. | ..................... | 411/10 |
| 7,670,079 B2 * | 3/2010 | Snadden et al. | .............. | 403/372 |
| 7,985,042 B1 * | 7/2011 | Paxton | .......................... | 411/527 |
| 2002/0182032 A1 * | 12/2002 | Anderson et al. | ............. | 411/533 |
| 2005/0025611 A1 * | 2/2005 | Rioux | ............................ | 411/429 |
| 2005/0079028 A1 * | 4/2005 | Hewgill | ........................ | 411/149 |
| 2005/0095085 A1 * | 5/2005 | Winker | .......................... | 411/533 |
| 2009/0047060 A1 * | 2/2009 | Turner et al. | ..................... | 403/27 |

* cited by examiner

Primary Examiner — Victor Batson
Assistant Examiner — Tyler Johnson
(74) Attorney, Agent, or Firm — Reising Ethington PC

(57) ABSTRACT

A direct load indicating fastener assembly includes a flange fastener of one-piece construction having a head with an integral flange. A load indicator has a flat base, a plurality of protuberances on the base and a peripheral rim. At least a portion of the peripheral rim overlies the fastener flange and captures the fastener in assembly with the load indicator while permitting free rotation of the fastener with respect to the indicator. The fastener preferably is a flange nut or a flange bolt. A hardened metal washer may be disposed between the load-indicating protuberances on the base and an undersurface of the fastener head.

9 Claims, 3 Drawing Sheets

DIRECT LOAD INDICATING FASTENER ASSEMBLY

The present disclosure relates to a direct load indicating fastener assembly that includes a flange fastener assembled to a direct load indicating washer.

BACKGROUND AND SUMMARY OF THE DISCLOSURE

U.S. Pat. No. 7,635,243 and 2009/0047060 disclose direct load indicating fastener assemblies, also called direct tension indicating fastener assemblies, that include a fastener assembled to a direct load indicating washer. Fabrication of means on the nut or bolt for rotatably mounting the washer is expensive. Furthermore, such washer-mounting means do not accommodate a hardened metal washer between the head of the fastener and the load indicating washer, which is desirable in many applications. A general object of the present disclosure is to provide a direct load indicating fastener assembly that addresses one or more of these shortcomings in the prior art.

The present disclosure embodies a number of aspects that can be implemented separately from or in combination with each other.

A direct load indicating fastener assembly, in accordance with one aspect of the present disclosure, includes a flange fastener of one-piece construction having a head with an integral flange. A load indicator has a flat base, a plurality of protuberances on the base and a peripheral rim. At least a portion of the peripheral rim overlies the fastener flange and captures the fastener in assembly with the load indicator while permitting free rotation of the fastener with respect to the indicator. The fastener preferably is a flange nut or a flange bolt. A hardened metal washer may be disposed between the load-indicating protuberances on the base and an undersurface of the fastener head.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
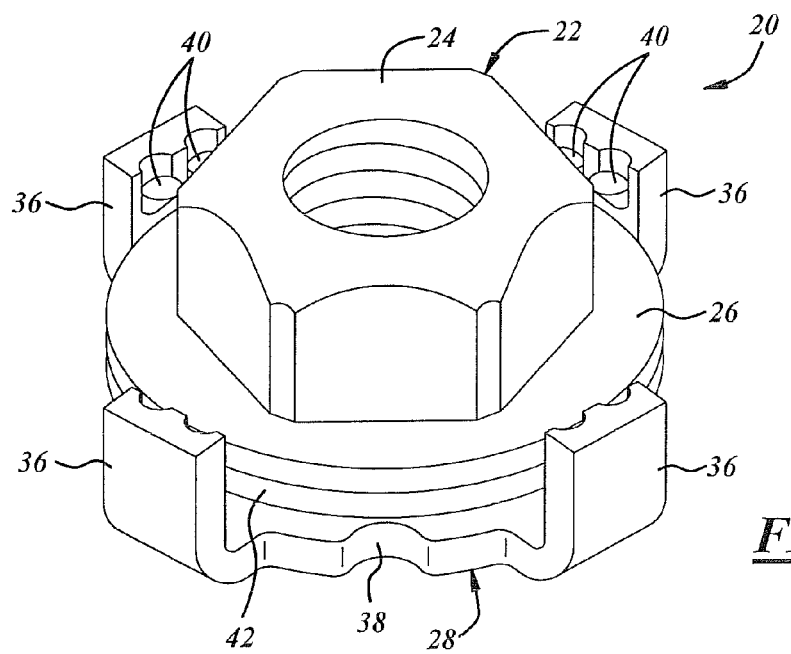
FIG. 1 is a perspective view of a direct load indicating fastener assembly in accordance with one exemplary embodiment of the present disclosure.

FIGS. 1-4 illustrate a direct load indicating fastener assembly 20 in accordance with one exemplary embodiment of the present disclosure. Assembly 20 includes a flange nut 22 having a hex head 24 from one end of which an integrally formed flange 26 extends radially outwardly. A direct load indicator 28 includes a flat base 30 from which a plurality of angularly spaced protuberances 32 upwardly extend toward nut 22. Protuberances 32 may be formed in any suitable manner. Base 30 is generally annular, having an outer periphery and an inner periphery forming a central opening 34. The outer periphery or rim of base 30 in the embodiment of FIGS. 1-4 includes a plurality of angularly spaced integral legs 36 and a plurality of intermediate indents 38 for indicating positions at which load readings can be taken on the assembly.

Figure 4:
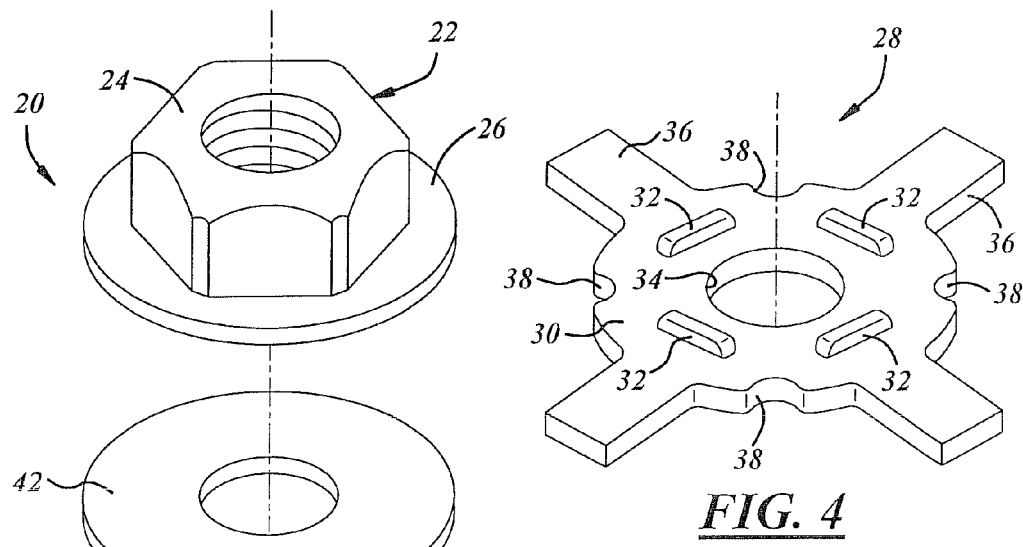
FIG. 4 is a perspective view of the load indicator in the assembly of FIGS. 1-3 at an intermediate stage of fabrication.
Figure 3:
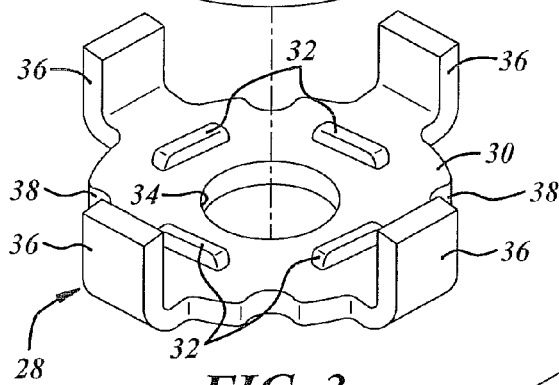
FIG. 3 is an exploded perspective view of the fastener assembly illustrated in FIG. 1.

Load indicator 28, including protuberances 32, opening 34, legs 36 and indents 38, preferably is formed in a progressive blanking and bending operation. FIG. 4 illustrates an intermediate stage of such fabrication, with legs 36 extending radially outwardly from base 30 and protuberances 32 formed on base 30. From this stage, legs 36 are bent upwardly to be substantially perpendicular to base 30. Nut 22 can then be assembled to indicator 28, and legs 36 suitably formed, deformed or reformed to capture nut 22 in assembly with indicator 28 while permitting free rotation of the nut. In the embodiment of FIGS. 1-4, such deformation of legs 36 comprises at least one stake 40 formed on each leg following assembly of nut 22 to indicator 28.

Assembly 20 may additionally include a hardened metal washer 42 disposed between base 30 of indicator 28 and an undersurface of flange 26 on nut 22. Washer 42 can help distribute the compressive force of nut 22 among the load-indicating protuberances 32 of indicator 28. Washer 42 is assembled to indicator 28 prior to nut 22 and prior to formation of stakes 40. Washer 42 is free to rotate with respect to nut 22 and indicator 28.

In general, assembly 20 is positioned over the threaded shank of a bolt or the like and nut 22 is tightened onto such bolt. Compression of protuberances 32 provides an indication of the tension or load applied to the bolt.

Figure 2:
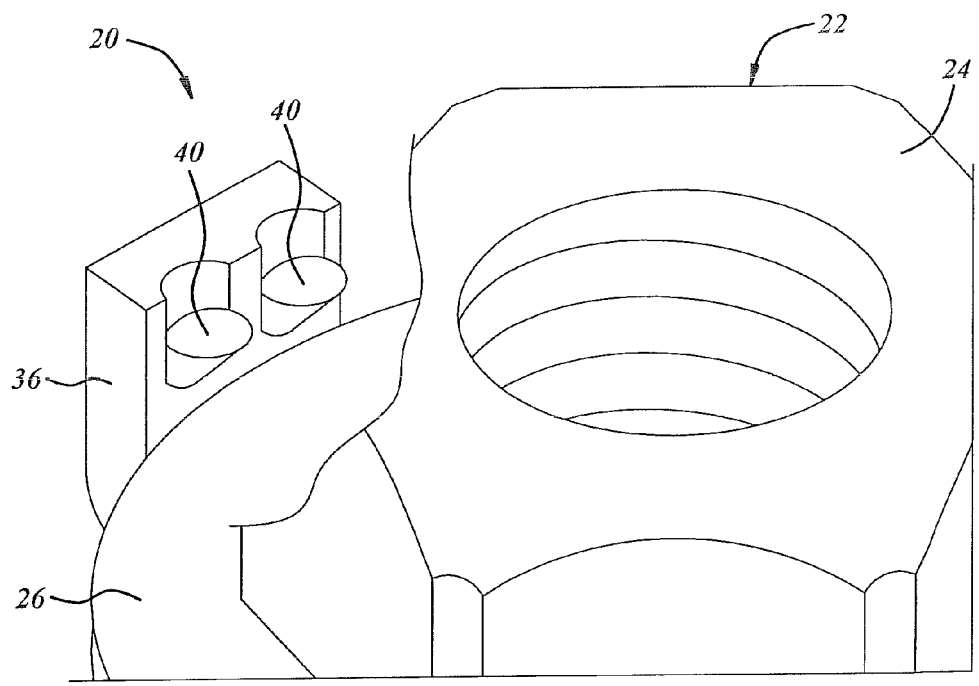
FIG. 2 is a fragmentary perspective view on an enlarged scale of a portion of the assembly illustrated in FIG. 1.
Figure 5:
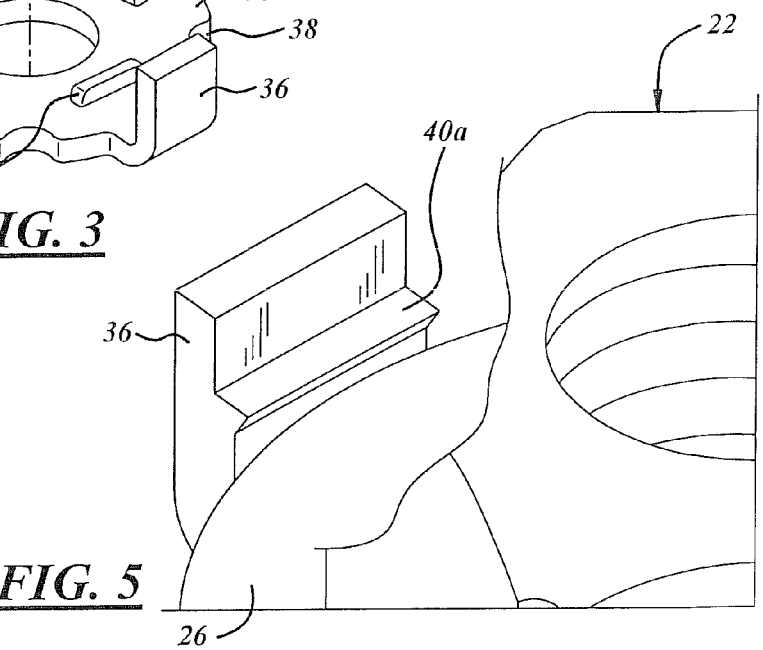
FIG. 5 is a fragmentary perspective view similar to that of FIG. 2 but illustrating a modified embodiment of the disclosure.

In FIG. 5, the stake 40a consists of deformation of the entire inside edge of leg 36, rather than angularly spaced deformations as in FIGS. 1-2. Stakes 40 and 40a preferably are formed in an automated operation after nut 22 or bolt 44 (and washer 42 when used) are placed among legs 36, as in FIG. 3.

Figure 6:
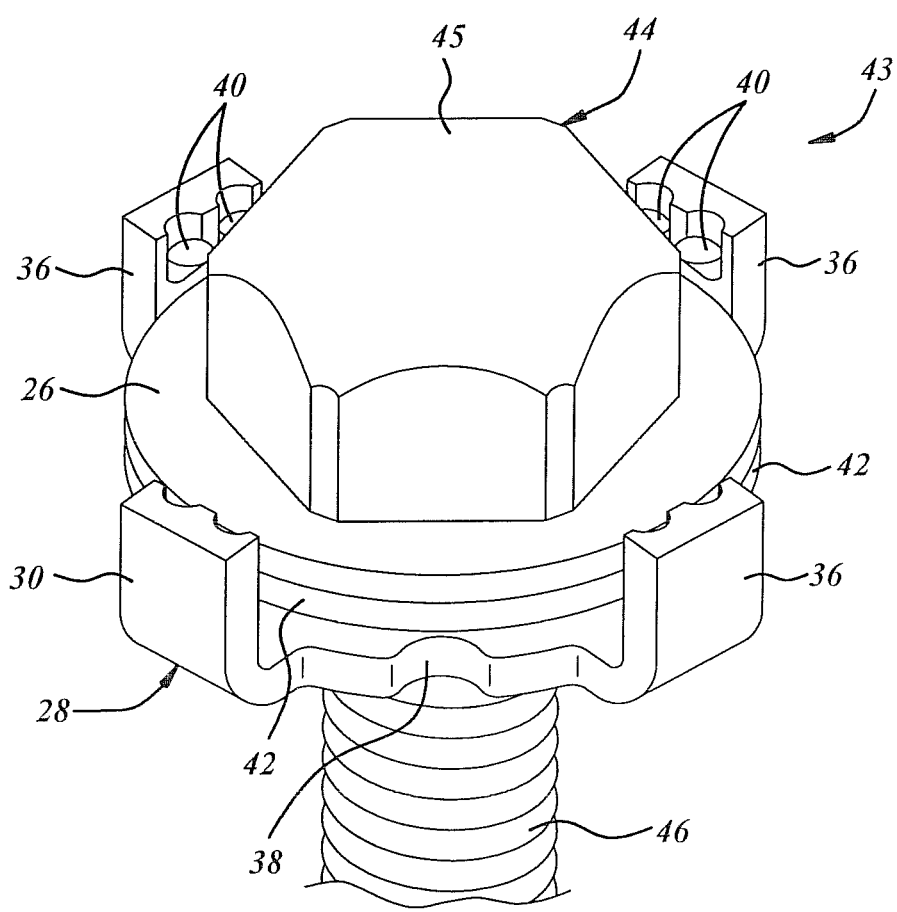
FIG. 6 is a fragmentary perspective view similar to that of FIG. 1 but illustrating another modified embodiment of the disclosure.

FIG. 6 illustrates a fastener assembly 43, in which the fastener comprises a flange bolt 44 rather than a flange nut. Bolt 44 has a hex head 45 and a threaded shank 46 that extends through central opening 34 (FIG. 3) of indicator 28, and through the central opening of washer 42 where such washer is employed.

There thus has been disclosed a direct load indicating fastener assembly that fully satisfies all of the objects and aims previously set forth. Flange nut 22 and flange bolt 44 are standard hardware items and require no expensive tooling. The disclosure has been presented in conjunction with several exemplary embodiments, and additional modifications and variations have been discussed. Other modifications and variations readily will suggest themselves to persons of ordinary skill in the art in view for the foregoing discussion. For example, nut 22 in FIGS. 1-5 and bolt 44 in FIG. 6 have hex-shaped drive heads; however, other drive head configurations could be employed. The disclosure is intended to embrace all such modifications and variations as fall within the spirit and broad scope of the appended claims.

The invention claimed is:
1. A direct load indicating fastener assembly that includes:
   a flange fastener of one-piece construction having a head with an integral flange extending radially outwardly from the head, and a load indicator having a flat, annular base having an outer rim and an inner opening, a plurality of protuberances on said base extending toward the flange fastener from locations on the base between the outer rim and the inner opening, wherein said protuberances are compressible to provide an indication of applied tension or load, said outer rim having a plurality of angularly spaced legs extending from the base, wherein the legs extend in the same direction as the protuberances and beyond the flange of the flange fastener in an assembled condition, wherein at least a portion of each leg includes at least one deformed stake that overlies said flange and captures said fastener in assembly with said load indicator while permitting free rotation of said fastener with respect to said load indicator, and wherein said outer rim of the base includes a plurality of intermediate indents for indicating positions at which load reading can be taken.

2. The assembly set forth in claim 1 wherein said flange fastener comprises a flange nut or a flange bolt.

3. The assembly set forth in claim 1 including a hardened metal washer disposed between said protuberances on said base and an undersurface of said head, said washer being free to rotate with respect to said fastener and said indicator.

4. The assembly set forth in claim 1 wherein said at least one deformed stake includes a pair of stakes.

5. The assembly set forth in claim 1 wherein said at least one deformed stake includes an entire inside edge of each of said legs.

6. A direct load indicating fastener assembly that includes:
a flange fastener of one-piece construction comprising a flange nut or a flange bolt having a hex head with an integral flange extending radially outwardly from the head, and a load indicator having a flat, annular base having an outer rim and an inner opening, a plurality of protuberances on said base extending toward the flange fastener from locations on the base between the outer rim and the inner opening, wherein said protuberances are compressible to provide an indication of applied tension or load, said outer rim with a plurality of angularly spaced legs extending from the base, each of said legs extending in the same direction as the protuberances and having at least one deformed stake portion that overlies said flange and captures said fastener in assembly with said load indicator while permitting free rotation of said fastener with respect to said load indicator, and wherein said outer rim of the base includes a plurality of intermediate indents for indicating positions at which load reading can be taken.

7. The assembly set forth in claim 6 including a hardened metal washer disposed between said protuberances on said base and an undersurface of said head of said fastener, said washer being free to rotate with respect to said fastener and said indicator.

8. The assembly set forth in claim 6 wherein said at least one deformed stake portion includes a pair of stakes.

9. The assembly set forth in claim 6 wherein said at least one deformed stake portion includes an entire inside edge of each of said legs.

* * * * *